US012725222B2

(12) United States Patent
Tsai et al.

(10) Patent No.: US 12,725,222 B2
(45) Date of Patent: Sep. 1, 2026

(54) DEMOSAICING DEVICE AND DEMOSAICING METHOD FOR IMAGE SENSOR

(71) Applicant: VisEra Technologies Company Ltd., Hsin-Chu City (TW)

(72) Inventors: Wei-Lung Tsai, Hsin-Chu City (TW); Ching-Chiang Wu, Hsin-Chu City (TW)

(73) Assignee: VISERA TECHNOLOGIES COMPANY LTD., Hsin-Chu City (TW)

( * ) Notice: Subject to any disclaimer, the term of this patent is extended or adjusted under 35 U.S.C. 154(b) by 349 days.

(21) Appl. No.: 18/411,792

(22) Filed: Jan. 12, 2024

(65) Prior Publication Data

US 2025/0232399 A1 Jul. 17, 2025

(51) Int. Cl.
*G06T 3/4015* (2024.01)
*G06T 5/50* (2006.01)
*H04N 23/84* (2023.01)

(52) U.S. Cl.
CPC .............. *G06T 3/4015* (2013.01); *G06T 5/50* (2013.01); *H04N 23/843* (2023.01); *G06T 2207/20221* (2013.01); *G06T 2207/20224* (2013.01)

(58) Field of Classification Search
None
See application file for complete search history.

(56) References Cited

U.S. PATENT DOCUMENTS

2025/0015121 A1* 1/2025 Zhu ........................ H10F 39/182

FOREIGN PATENT DOCUMENTS

CN 105681771 A * 6/2016 ............. H04N 25/77
CN 212807296 U * 3/2021
WO WO-2023179527 A1 * 9/2023 ............. H04N 25/79

OTHER PUBLICATIONS

Kwan et al., "Debayering RGBW color filter arrays: A pansharpening approach", Publication Year: 2017, DOI: 10.1109/UEMCON.2017.8248995 (Year: 2017).*

(Continued)

*Primary Examiner* — Chan S Park
*Assistant Examiner* — Promotto Tajrian Islam
(74) *Attorney, Agent, or Firm* — MUNCY, GEISSLER, OLDS & LOWE, P.C.

(57) ABSTRACT

This disclosure provides a demosaicing device and a demosaicing method for image sensor. The method includes capturing a panchromatic image by using a pixel array including switchable pixels and clear pixels, where the panchromatic image is captured when the switchable pixels and the clear pixels are under a clear state. The method includes capturing a chromic image by using the pixel array when the switchable pixels are under a color state and the clear pixels are under the clear state. The method includes performing a weighted average calculation and a signal subtraction on the chromic image and the panchromatic image to generate first resolution chromic images. A resolution of the first resolution chromic images is the same as a resolution of the panchromatic image and the chromic image. The method includes fusing the first resolution chromic images with the panchromatic image to generate demosaiced chromic images.

16 Claims, 8 Drawing Sheets

(56) References Cited

OTHER PUBLICATIONS

Bayer Filter, Wikipedia, https://en.wikipedia.org/wiki/Bayer_filter (Year: 2026).*

Wang et al., “High-quality image deblurring with panchromatic pixels”, DOI:https://doi.org/10.1145/2231816.2231818 (Year: 2012).*

* cited by examiner

DEMOSAICING DEVICE AND DEMOSAICING METHOD FOR IMAGE SENSOR

BACKGROUND

Field of Invention

The present disclosure relates to the image sensor. More particularly, the present disclosure relates to the demosaicing device and the demosaicing method for the image sensor.

Description of Related Art

After an image sensor with a pixel array capture an image, a demosaicing method can be performed on the captured image to acquire a reconstructed image. Since the quality and resolution of the reconstructed image are largely based on the demosaicing process, it is essential to improve the demosaicing method and the corresponding image sensor.

SUMMARY

According to some embodiments of the present disclosure, a demosaicing method for an image sensor includes the following steps. A panchromatic image is captured by using a pixel array including a plurality of switchable pixels and a plurality of clear pixels when the switchable pixels and the clear pixels are under a clear state. A chromic image is captured by using the pixel array when the switchable pixels are under a color state and the clear pixels are under the clear state. A weighted average calculation and a signal subtraction are performed on the chromic image and the panchromatic image to generate a plurality of first resolution chromic images, where a resolution of the first resolution chromic images is same as a resolution of the panchromatic image and the chromic image. The plurality of the first resolution chromic images are fused with the panchromatic image to generate a plurality of demosaiced chromic images.

According to some embodiments of the present disclosure, a demosaicing device for an image sensor includes a pixel array capturing a panchromatic image and a chromic image. The pixel array includes a switchable pixel and a clear pixel adjacent to the switchable pixel. The switchable pixel includes a first photodiode and an electrochromic layer above the first photodiode, while the clear pixel includes a second photodiode. When the electrochromic layer is unbiased, the switchable pixel and the clear pixel are under a clear state. When the electrochromic layer is biased, the switchable pixel is under a color state, and the clear pixel is under the clear state. The demosaicing device includes a calculating circuit performing a weighted average calculation and a signal subtraction on the chromic image and the panchromatic image to generate a plurality of first resolution chromic images. The demosaicing device includes a correction circuit fusing the plurality of the first resolution chromic images with the panchromatic image to generate a plurality of demosaiced chromic images.

According to the above-mentioned embodiments, the demosaicing device for the image sensor includes the switchable pixels and the clear pixels. The switchable pixel can switch between the clear state and the color state by applying the bias to the electrochromic layer in the switchable pixel. Therefore, the panchromatic image and the chromic image can be captured by the same pixel array, which allows reconstructing the high resolution image and simplifying the operations of the demosaicing process for the image sensor to reduce the signal loss.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
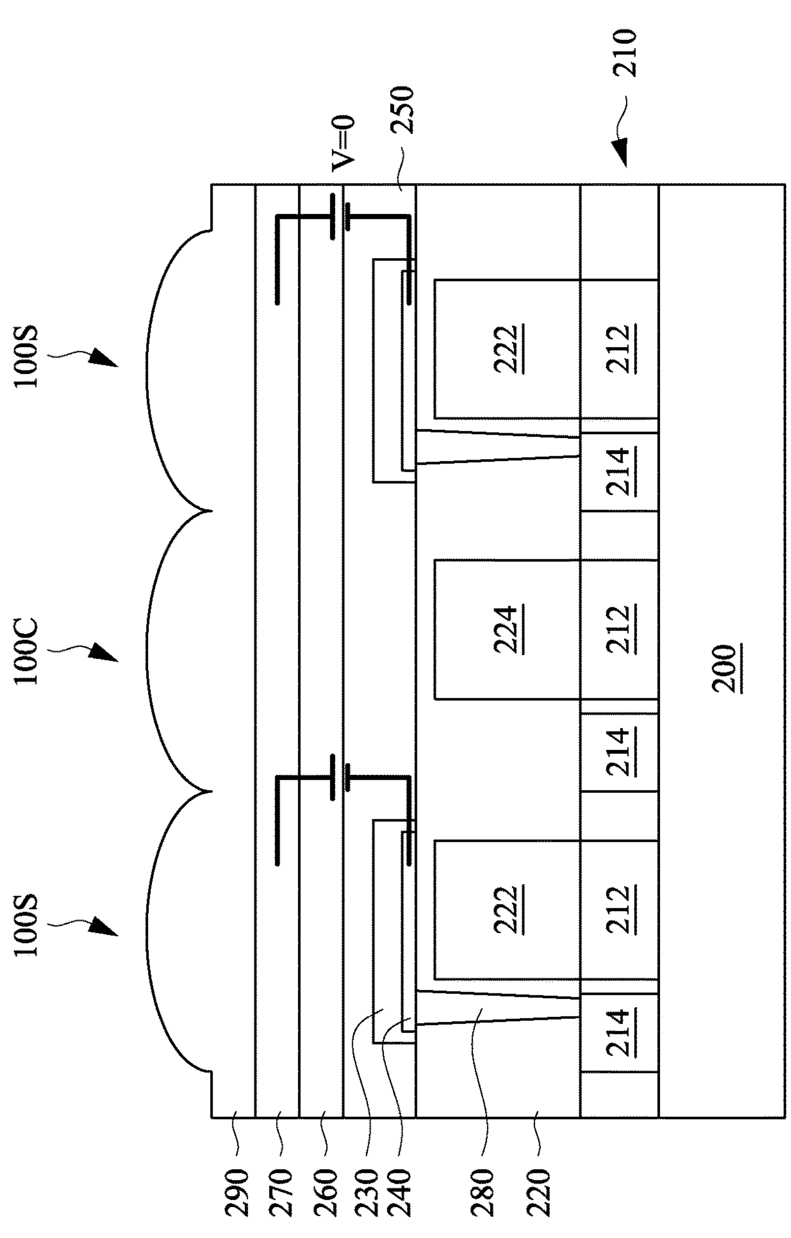
FIG. 1A illustrates a cross-sectional view of a demosaicing device for an image sensor with the unbiased electrochromic layer according to some embodiments of the present disclosure.

The following disclosure provides many different embodiments, or examples, for implementing different features of the provided subject matter. Specific examples of components, arrangements, etc., are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides the demosaicing device for an image sensor including the switchable pixels and the clear pixels arranged as the pixel array and the demosaicing method for the image sensor. Since the switchable pixels can switch between the clear state and the color state due to the electrochromic layer therein, the panchromatic image and the chromic image of the object may be captured by the same pixel array of the demosaicing device. The panchromatic image and the chromic image may be processed together by the simplified operations of the demosaicing method, which provides the reconstructed image with high resolution and reduces the signal loss during the demosaicing process.

Figure 1B:
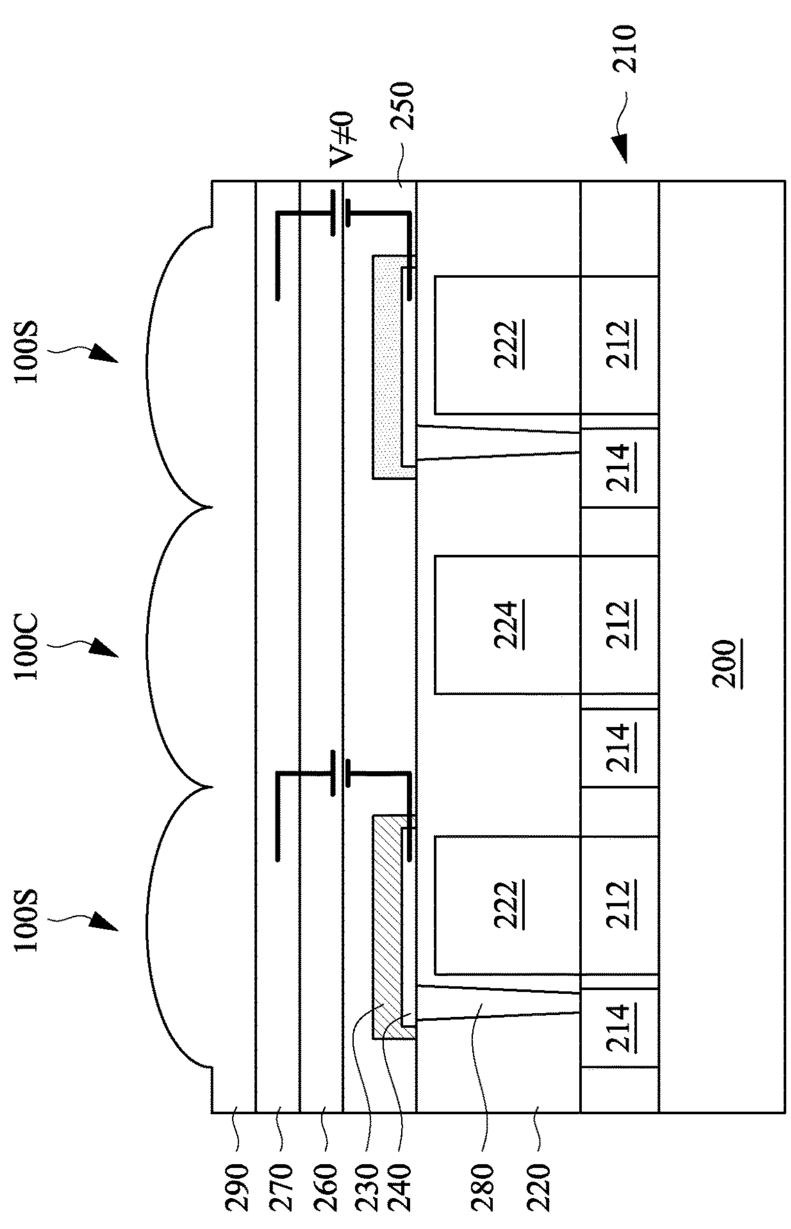
FIG. 1B illustrates a cross-sectional view of a demosaicing device for an image sensor with the biased electrochromic layer according to some embodiments of the present disclosure.

According to some embodiments of the present disclosure, FIG. 1A and FIG. 1B illustrate cross-sectional views of a demosaicing device 10 for an image sensor. The demosaicing device 10 includes a plurality of switchable pixels 100S and a plurality of clear pixels 100C, where each of the clear pixels 100C is arranged adjacent to at least one of the switchable pixels 100S. A pixel array (for example, the pixel array 100 in FIG. 2A and FIG. 2B) formed by the switchable pixels 100S and the clear pixels 100C in the demosaicing device 10 can be used to capture a panchromatic image and a chromic image, which will be further discussed in detail.

Specifically, the switchable pixel 100S includes a substrate 200, a circuit layer 210 above the substrate 200, a photodiode 222 in a passivation layer 220 above the circuit layer 210, and an electrochromic layer 230 above the photodiode 222. The photodiode 222 is controlled by a transistor 212 in the circuit layer 210 to transform the incident light into the electric signal. The electrochromic layer 230 is controlled by a transistor 214 in the circuit layer 210 to switch between a transparent appearance and a colored appearance. In some embodiments, the photodiode 222 and the electrochromic layer 230 may be individually controlled by different transistor 212 and transistor 214, so that the photodiode 222 may generate the electric signals whether the electrochromic layer 230 is transparent or colored. For example, the transistor 212 for the photodiode 222 may include a group of sub-transistors, while the transistor 214 for the electrochromic layer 230 is a single transistor besides from the sub-transistors.

When the electrochromic layer 230 is transparent, the incident light with a wide wavelength range may penetrate through the electrochromic layer 230 and reach the photodiode 222. When the electrochromic layer 230 switches to the colored appearance, the incident light is first filtered by the electrochromic layer 230 before being received by the photodiode 222. In some embodiments, the switchable pixel 100S further includes a bottom electrode 240 between the photodiode 222 and the electrochromic layer 230, an electrolyte layer 250 disposed on and contacts the electrochromic layer 230, an ion storage layer 260 disposed on the electrolyte layer 250, and a top electrode 270 disposed on the ion storage layer 260 to switch between the transparent and colored appearance.

The bottom electrode 240 may be electrically connected to the transistor 214 through a contact via 280 in the passivation layer 220, so that the bottom electrode 240 and the top electrode 270 can apply a voltage bias to the electrochromic layer 230 under the control of the transistor 214. As the voltage bias is applied to the electrochromic layer 230, a reduction-oxidation reaction happens in the electrochromic layer 230, leading to the changed valence amount of the electrochromic layer 230. Therefore, the transparent electrochromic layer 230 can switch into the colored electrochromic layer 230 after being biased. During the voltage biasing, the electrolyte layer 250 and the ion storage layer 260 may serve as the charge pathway and the charge storage for the electrochromic layer 230 to achieve the reduction-oxidation reaction. In some embodiments, the bottom electrode 240 and the top electrode 270 may be made of transparent conductive materials to reduce the incident light loss before the light reaches the photodiode 222.

When the electrochromic layer 230 is unbiased as shown in FIG. 1A, the electrochromic layer 230 is transparent to allow the incident light to transmit with nearly no absorbance by the electrochromic layer 230. As a result, the incident light reaching the photodiode 222 has a wide wavelength range, thereby providing the switchable pixel 100S under a clear state. Alternatively, when the electrochromic layer 230 is biased as shown in FIG. 1B, the electrochromic layer 230 switches to the colored appearance (shown as the screentones in FIG. 1B) to allow the incident light in a specific wavelength range to transmit. The incident light is filtered by the electrochromic layer 230 before reaching the photodiode 222, thereby providing the switchable pixel 100S under a color state. In other words, the biased electrochromic layer 230 acts as a color filter for the switchable pixel 100S such that the spectrum of the switchable pixel 100S in FIG. 1B is the same as the spectrum of the biased electrochromic layer 230.

The clear pixel 100C adjacent to the switchable pixel 100S has a structure similar to that of the switchable pixel 100S, but the electrochromic layer 230 is absent from the clear pixel 100C. As shown in FIG. 1A and FIG. 1B, the clear pixel 100C includes the substrate 200, the circuit layer 210 above the substrate 200, and a photodiode 224 in the passivation layer 220. The photodiode 224 in the clear pixel 100C is not overlapped by an electrochromic layer 230, so that the light received by the clear pixel 100C remains unfiltered even if the electrochromic layer 230 in the switchable pixel 100S is biased. As a result, the clear pixel 100C in FIG. 1A and the clear pixel 100C in FIG. 1B are both under a clear state.

In some embodiments, the electrolyte layer 250, the ion storage layer 260, and the top electrode 270 in the switchable pixel 100S may extend above the photodiode 224 in the clear pixel 100C to maintain the structural balance of the demosaicing device 10. For example, the clear pixel 100C may also include the electrolyte layer 250 above the photodiode 224, the ion storage layer 260, and the top electrode 270, where each of these layers has a levelled top surface in the switchable pixel 100S and the clear pixel 100C. In such embodiments, the switchable pixel 100S and the clear pixel 100C may further include a micro lens array 290 on the top electrode 270, where the micro lens array 290 extends above the photodiode 222 and the photodiode 224 to increase the incident light into the switchable pixel 100S and the clear pixel 100C.

Figure 2A:
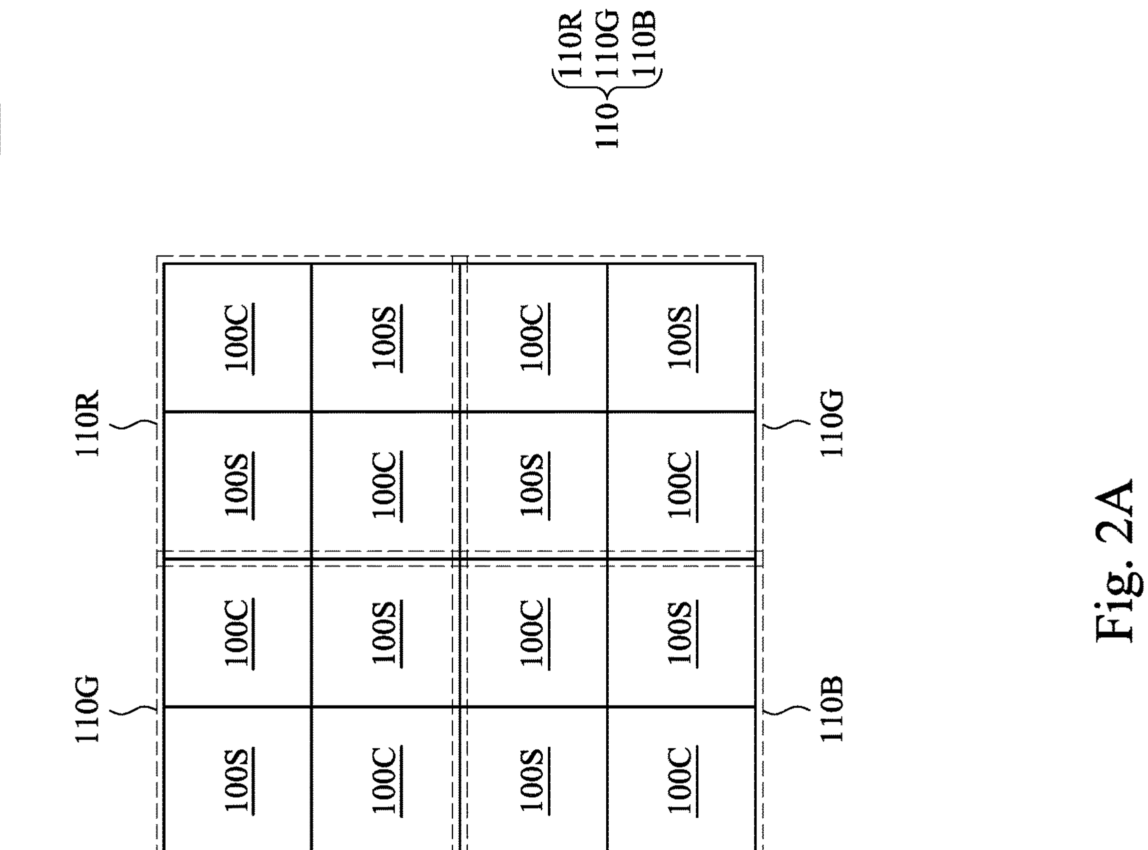
FIG. 2A illustrates a schematic diagram of the pixel array of the demosaicing device for capturing a panchromatic image according to some embodiments of the present disclosure.
Figure 2B:
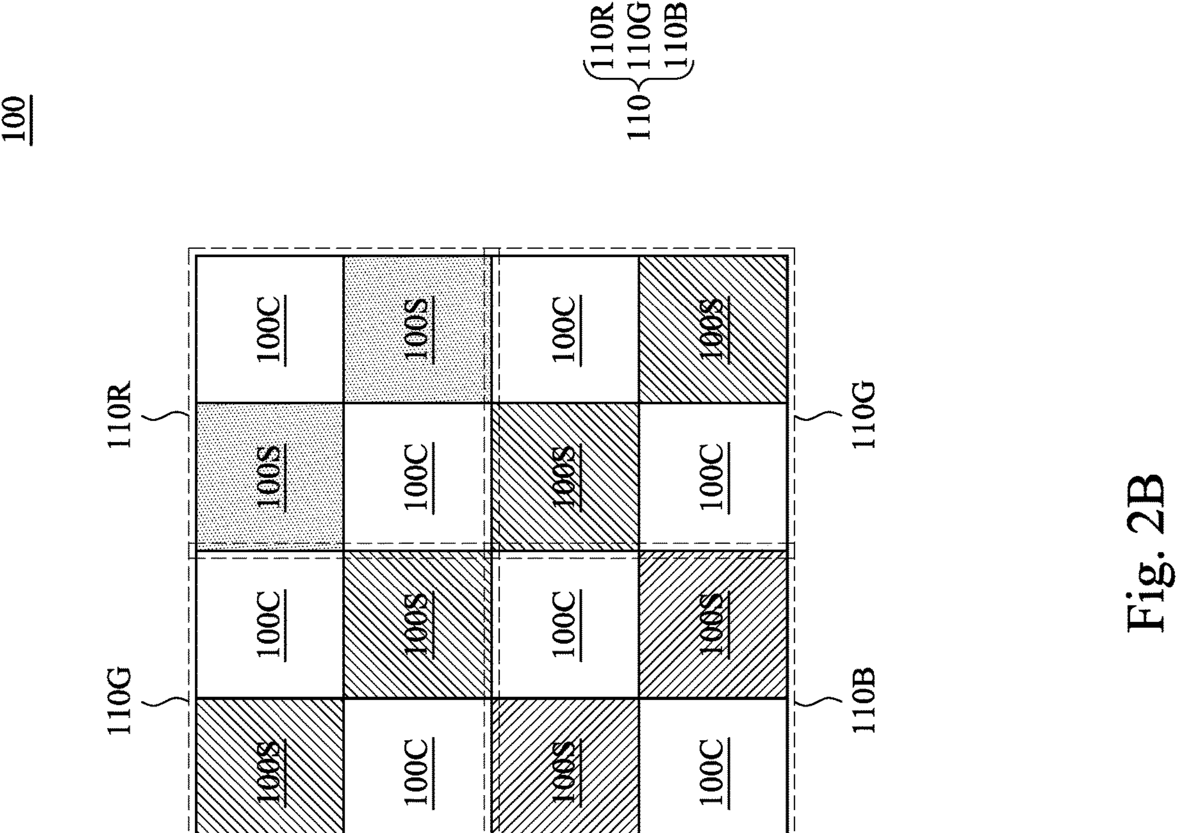
FIG. 2B illustrates a schematic diagram of the pixel array of the demosaicing device for capturing a chromic image according to some embodiments of the present disclosure.

According to some embodiments of the present disclosure, FIG. 2A and FIG. 2B illustrate schematic diagrams of a pixel array 100 of the demosaicing device for an image sensor, respectively. The pixel array 100 includes the switchable pixels 100S and the clear pixels 100C illustrated in the demosaicing device 10 in FIG. 1A and FIG. 1B, in which the switchable pixels 100S and the clear pixels 100C are alternately arranged as a two-dimensional array. For example, the pixel array 100 may be composed of eight switchable pixels 100S and eight clear pixels 100C alternately arranged as a two-dimensional array of four rows by four columns. The pixel array 100 may be a minimum repeating unit in the demosaicing device, so that the demosaicing device is able to capture a mosaicked image (not shown) via the pixel array 100.

The pixel array 100 in FIG. 2A may correspond to the demosaicing device 10 in FIG. 1A, where the electrochromic layers 230 in the switchable pixels 100S are unbiased and remain transparent. In other words, the switchable pixels 100S and the clear pixels 100C of the pixel array 100 in FIG. 2A are both under the clear state. Since the incident light reaching the photodiodes of the switchable pixels 100S and the clear pixels 100C is not filtered by the unbiased electrochromic layers 230, the pixel array 100 in FIG. 2A can be used to capture a panchromatic image that provides a luminance signal of the object.

Alternatively, the pixel array 100 in FIG. 2B may correspond to the demosaicing device 10 in FIG. 1B, where the electrochromic layers 230 in the switchable pixels 100S are biased and switch into the colored appearance. In other words, the switchable pixels 100S of the pixel array 100 in FIG. 2B are under the color state while the clear pixels 100C are under the clear state. Since the incident light reaching the photodiodes of the switchable pixels 100S is filtered by the biased electrochromic layers 230, the pixel array 100 in FIG. 2B can be used to capture a chromic image that provides a chromaticity signal of the object.

It should be noted that the same pixel array 100 can be used to capture the panchromatic image and the chromic image for the object. As the switchable pixels 100S can easily switch between the clear state and the color state by applying the bias to the electrochromic layers, the demosaicing device including the pixel array 100 may rapidly capture the panchromatic image and the chromic image of the same object. The two images having different signals of the object may be used together in the demosaicing process to reconstruct the image with high resolution and quality.

In some embodiments, the switchable pixels 100S and the clear pixels 100C of the pixel array 100 may be divided into a plurality of pixel sets 110. The pixel set 110 is a minimum repeating unit for some processing operations in the demosaicing method, such as the demosaicing methods S300 and S400 in FIG. 3A and FIG. 4A, for the pixel array 100. For example, a pixel set 110 may include two of the switchable pixels 100S and two of the clear pixels 100C in the pixel array 100, where the two switchable pixels 100S and the two clear pixels 100C are alternately arranged in an array of two rows by two columns. The two switchable pixels 100S of one pixel set 110 have the same spectrum when the electrochromic layers of the switchable pixels 100S are biased.

In the embodiments which the pixel set 110 includes two switchable pixels 100S and two clear pixels 100C, the pixel array 100 may be composed by four pixel sets 110 with various spectra when the switchable pixels 100S are under the color state. As shown in FIG. 2B, the pixel array 100 may include two first pixel sets 110G, one second pixel set 110R and one third pixel set 110B, where each of the first pixel set 110G, the second pixel set 110R and the third pixel set 110B includes two switchable pixels 100S and two clear pixels 100C. The switchable pixels 100S of the first pixel set 110G, the second pixel set 110R and the third pixel set 110B have different spectra when the electrochromic layers of the switchable pixels 100S are biased. The first pixel sets 110G, the second pixel set 110R and the third pixel set 110B are arranged in an array of two rows by two columns, and any adjacent two of the pixel sets have different spectra when the switchable pixels 100S are under the color state.

For example, the pixel array 100 may include the first pixel sets 110G at the upper left corner and the lower right corner, the second pixel set 110R at the upper right corner, and the third pixel set 110B at the lower left corner of the pixel array 100. The switchable pixels 100S of the first pixel set 110G under the color state are green pixels to allow the green light to pass through. The switchable pixels 100S of the second pixel set 110R under the color state are red pixels to allow the red light to pass through. The switchable pixels 100S of the third pixel set 110B under the color state are blue pixels to allow the blue light to pass through. In such embodiments, the first pixel set 110G may be more than the second pixel set 110R or the third pixel set 110B in one pixel array 100 to capture images with higher chromaticity accuracy since the human eyes are more sensitive to the green light. It should be noted that the combination of green/red/blue pixels is one embodiment of the pixel array 100, and the switchable pixels 100S of the pixel array 100 in some other embodiments may include, but not limited to, cyan, magenta, yellow, or other spectrum.

As mentioned above, the demosaicing device 10 can be used to capture the panchromatic image and the chromic image by the pixel array 100. Since the panchromatic image and the chromic image of the same object are captured by the same pixel array 100, the panchromatic image and the chromic image may be together used in the demosaicing method for the image sensor to simplify the operations for reconstructing the image. In addition, the pixels of the panchromatic image can match with the pixels of the chromic image, so that the demosaicing method using the panchromatic image and the chromic image may reconstruct the image with high resolution and quality.

Figure 3A:
FIG. 3A illustrates a flow diagram of a demosaicing method according to some embodiments of the present disclosure.
Figure 3A:
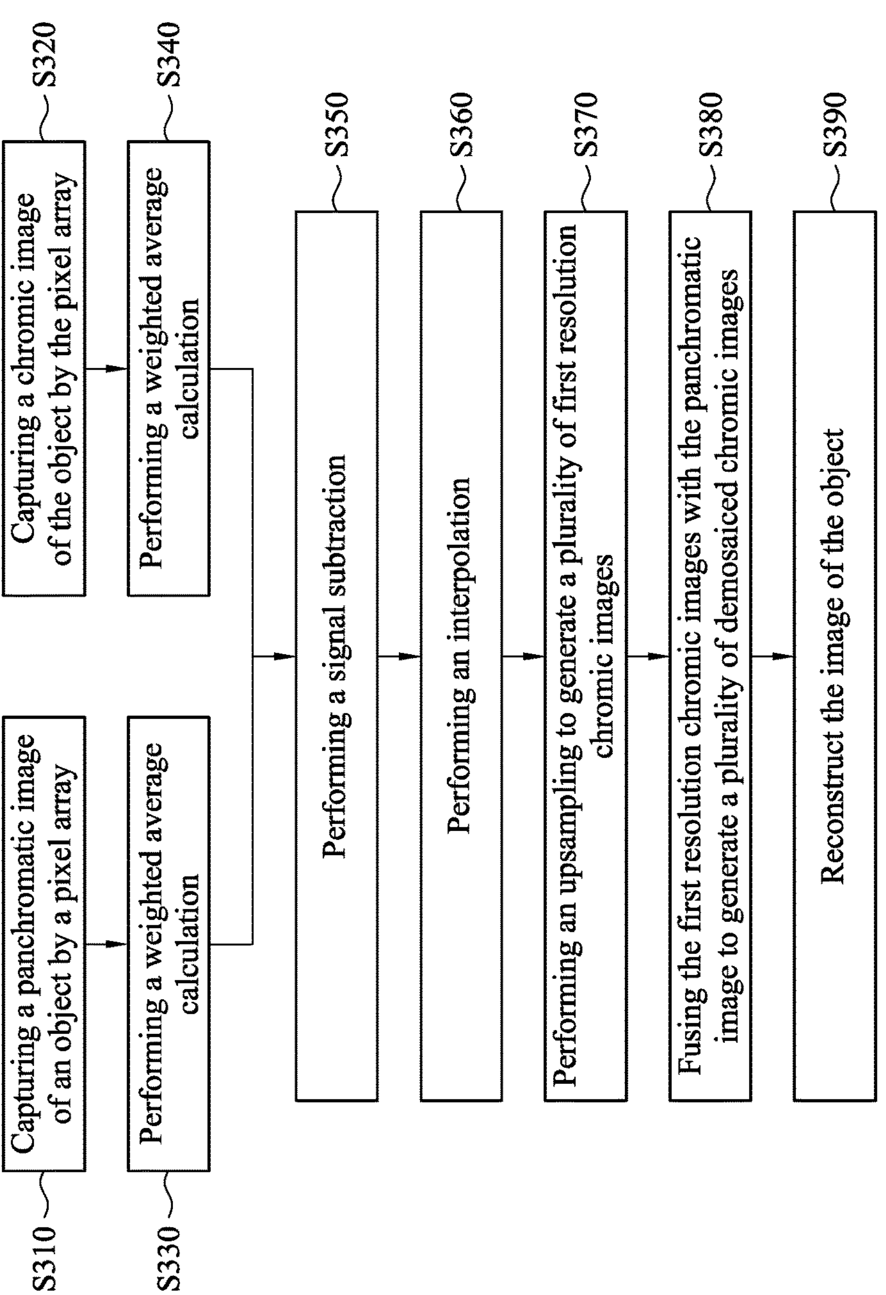
Figure 3B:
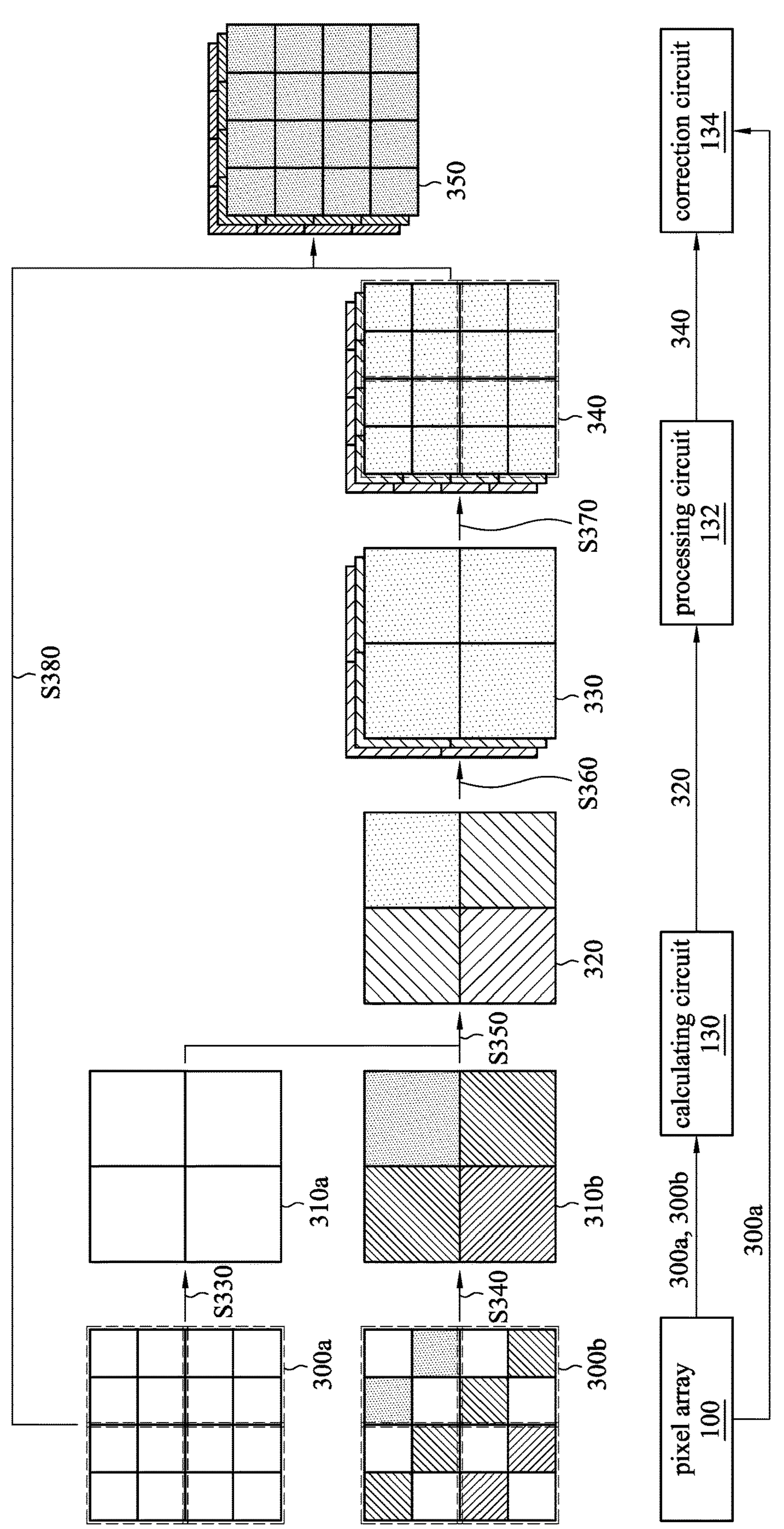
FIG. 3B illustrates a schematic diagram of a demosaicing process for an image by the demosaicing method in FIG. 3A.
Figure 4A:
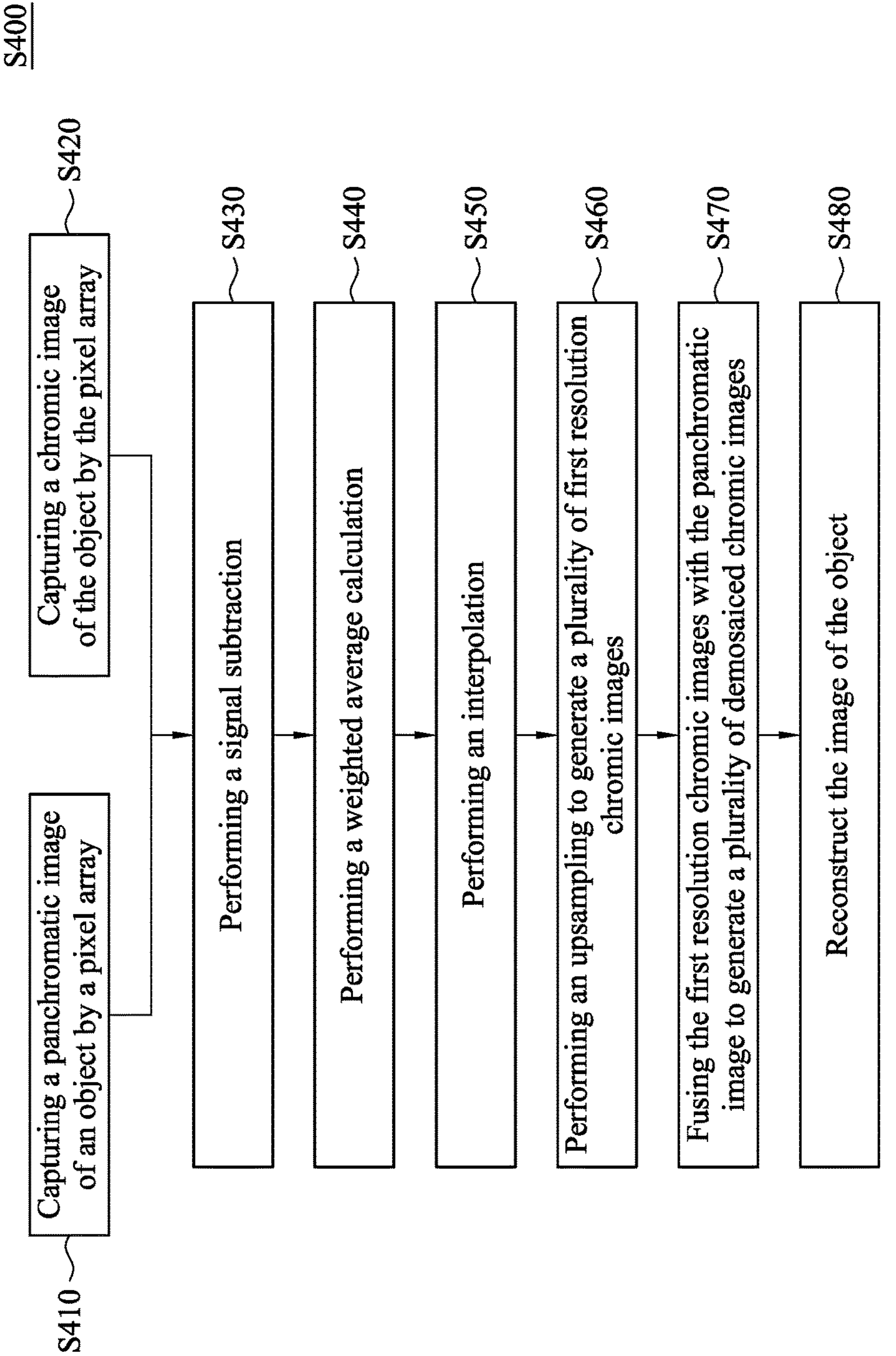
FIG. 4A illustrates a flow diagram of a demosaicing method according to some embodiments of the present disclosure.
Figure 4B:
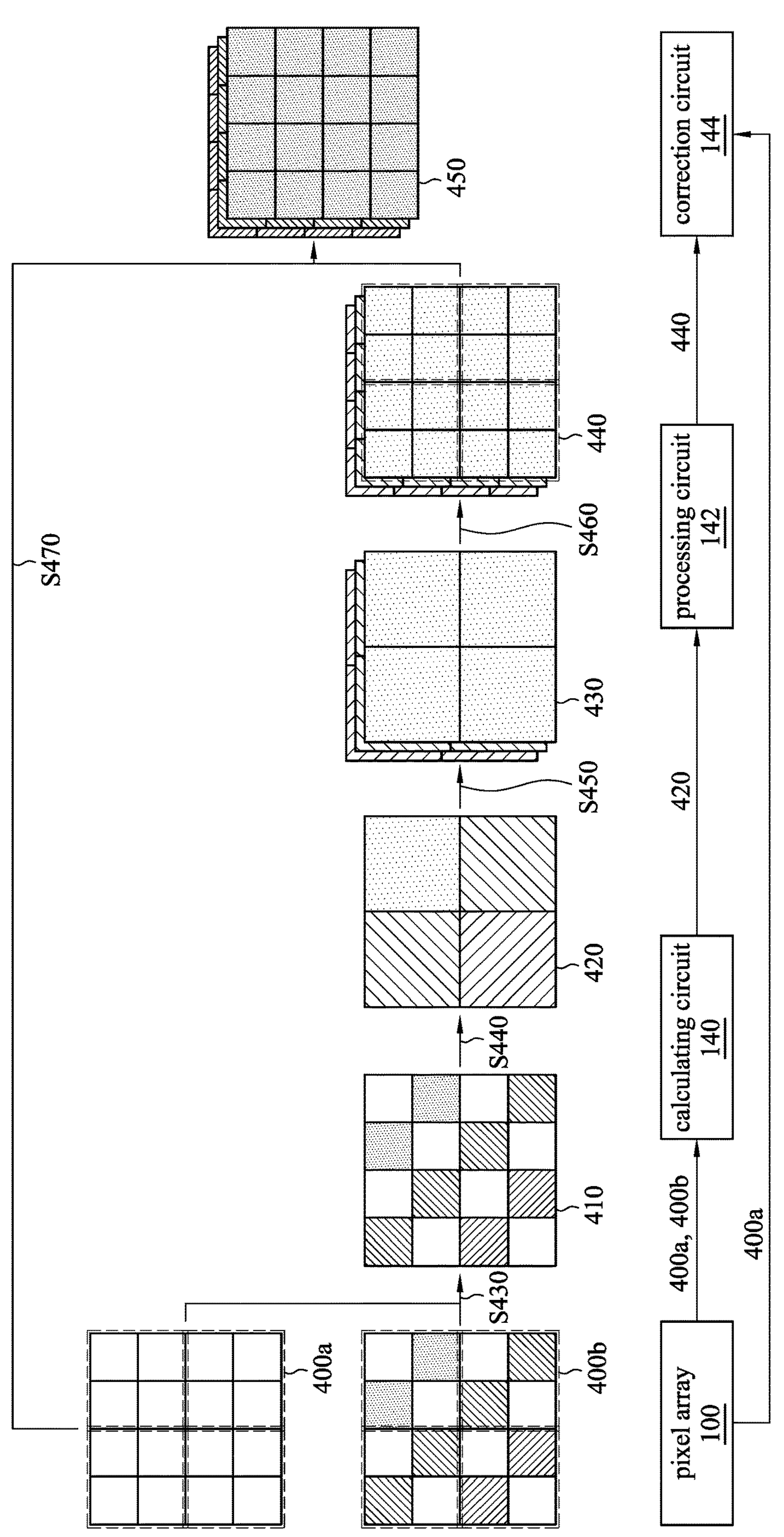
FIG. 4B illustrates a schematic diagram of a demosaicing process for an image by the demosaicing method in FIG. 4A.

According to some embodiments of the present disclosure, FIG. 3A illustrates a flow diagram of a demosaicing method S300, and FIG. 3B illustrates a schematic diagram of the demosaicing process for an image by the method S300 in FIG. 3A. According to some other embodiments of the present disclosure, FIG. 4A illustrates a flow diagram of a demosaicing method S400, and FIG. 4B illustrates a schematic diagram of the demosaicing process for an image by the method S400 in FIG. 4A. The method S300 and method S400 can be used for, for example, reconstructing the image captured by the demosaicing device 10 in FIG. 1A and FIG. 1B. However, those skilled in the art should understand that the method S300 and method S400 can also be used for reconstructing the image captured by the demosaicing device with the switchable pixels within the scope of the present disclosure. In addition, additional operations can be provided before, during, and after the method S300, and some operations described can be replaced, eliminated, or moved around for additional embodiments.

The method S300 is described below in conjunction with FIG. 3A and FIG. 3B. The method S300 begins at step S310 and step S320, where a panchromatic image 300*a* and a chromic image 300*b* of an object are captured by a pixel array 100 of the demosaicing device, such as the pixel array 100 in FIG. 2A and FIG. 2B. Specifically, the switchable pixels and the clear pixels of the pixel array may be set to the clear state in step S310 to capture the panchromatic image 300*a*. The switchable pixels are switched into the color state by applying the bias in step S320, while the clear pixels remain the clear state to capture the chromic image 300*b*. In some embodiments, the sequence of step S310 and step S320 are interchangeable, which is not intended to limit the present disclosure.

In other words, the panchromatic image 300*a* and the chromic image 300*b* are separately captured by the same pixel array, except that the switchable pixels of the pixel array for capturing the two images are under different states. Therefore, the panchromatic image 300*a* and the chromic image 300*b* have the same resolution. The panchromatic image 300*a* and the chromic image 300*b* may have a high resolution as both of them include all pixels of the pixel array.

The method S300 then proceeds to step S330 to step S370, where a weighted average calculation, a signal subtraction, an interpolation, and an upsampling are performed on the panchromatic image 300*a* and the chromic image 300*b* by a calculating circuit 130 and a processing circuit 132 of the demosaicing device to generate a plurality of first resolution chromic images 340. After step S330 to step S370, the resolution of the first resolution chromic images 340 is the same as the resolution of the panchromatic image 300*a* and the chromic image 300*b*.

In step S330, the weighted average calculation is performed on the panchromatic image 300*a* by the calculating circuit 130 to generate an averaged panchromatic image 310*a*. Specifically, the weighted average calculation is performed based on the pixel set of the pixel array such that the averaged signal of the pixels in one pixel set represents one signal of the pixel set. In the embodiments which the pixel set includes four pixels, the signals of the two switchable pixels under the clear state and the two clear pixels under the clear state of one pixel set are averaged to generate an averaged signal of the pixel set. As a result, the averaged panchromatic image 310*a* represented by the pixel set array of two rows by two columns is generated from the panchromatic image 300*a* represented by the pixel array of four rows by four columns. Therefore, the resolution of the averaged panchromatic image 310*a* is lower than the resolution of the panchromatic image 300*a*.

In step S340, the weighted average calculation is performed on the chromic image 300*b* by the calculating circuit 130 to generate an averaged chromic image 310*b*. The weighted average calculation performed on the chromic image 300*b* is different from the weighted average calculation performed on the panchromatic image 300*a*. For the chromic image 300*b*, the signals of the two switchable pixels under the color state of one pixel set are averaged to generate an averaged signal of the pixel set. The signals of the two clear pixels under the clear state may not be used in the weighted average calculation. As a result, the averaged chromic image 310*b* represented by the pixel set array of two rows by two columns is generated from the chromic image 300*b* represented by the pixel array of four rows by four columns. Therefore, the resolution of the averaged chromic image 310*b* is lower than the resolution of the chromic image 300*b* but the same as the resolution of the averaged panchromatic image 310*a*.

In step S350, the signal subtraction is then performed on the averaged panchromatic image 310*a* and the averaged chromic image 310*b* by the calculating circuit 130 to generate a subtracted chromic image 320. Specifically, a signal of the averaged panchromatic image 310*a* is subtracted from a signal of the averaged chromic image 310*b* to generate the signal of the subtracted chromic image 320. The signal subtraction is performed based on the pixel set of the pixel array. In other words, an averaged signal of one pixel set of the averaged panchromatic image 310*a* is subtracted from an averaged signal of the corresponding one pixel set of the averaged chromic image 310*b* to generate a subtracted-averaged signal of one pixel set of the subtracted chromic image 320. Therefore, the resolution of the subtracted chromic image 320 is the same as the resolution of the averaged chromic image 310*b*.

In step 360, an interpolation is then performed on the subtracted chromic image 320 by the processing circuit 132 to generate a plurality of second resolution chromic images 330. Specifically, the pixel array of the subtracted chromic image 320 includes the switchable pixels having different spectrum. The subtracted chromic image 320 is interpolated to generate the second resolution chromic images 330, where the numbers of the second resolution chromic images 330 corresponds to the spectra amount included in the subtracted chromic image 320. For one second resolution chromic image 330, the signal of all pixel sets is represented by the subtracted-averaged signal of one pixel set included in the subtracted chromic image 320.

For example, the subtracted chromic image 320 may include two first pixel sets having the first spectrum, one second pixel set having the second spectrum, and one third pixel set having the third spectrum. After the interpolation, three second resolution chromic images 330 are generated corresponding to the first spectrum, the second spectrum, and the third spectrum. The pixel sets of one of the second resolution chromic images 330 has the subtracted-averaged signal that is averaged from those of the first pixel sets. The pixel sets of the other two second resolution chromic images 330 has the subtracted-averaged signal of the second pixel set and the third pixel set, respectively. Therefore, the resolution of the second resolution chromic images 330 is the same as the resolution of the subtracted chromic image 320.

In step S370, an upsampling is then performed on the second resolution chromic images 330 by the processing circuit 132 to generate the first resolution chromic images 340. Each second resolution chromic image 330 is upsampled to one of the first resolution chromic images 340, so that the number of the first resolution chromic images 340 is the same as the number of the second resolution chromic images 330. For example, the pixel array of the panchromatic image 300*a* has sixteen pixels arranged as four rows by four columns, and the pixel set array of the second resolution chromic image 330 has four pixel sets arranged as two rows by two columns. The upsampling process is configured to divide the four pixel sets of the second resolution chromic image 330 into the sixteen pixels to generate the first resolution chromic image 340. Therefore, the resolution of the first resolution chromic images 340 is higher than the resolution of the second resolution chromic images 330 but the same as the resolution of the panchromatic image 300*a* and the chromic image 300*b*.

The method S300 then proceeds to step S380, where the first resolution chromic images 340 are fused with the panchromatic image 300*a* by a correction circuit 134 of the demosaicing device to generate a plurality of demosaiced chromic images 350. Specifically, the signal of one of the first resolution chromic images 340 is fused with the signal of the panchromatic image 300*a* to generate one of the demosaiced chromic images 350, so that the demosaiced chromic image 350 includes both the luminance and chromaticity of the object. The first resolution chromic images 340 are individually fused with the panchromatic image 300*a*, so that the number of the demosaiced chromic images 350 is the same as the number of the first resolution chromic image 340. Since the pixel amounts remain the same during step S370, the resolution of the demosaiced chromic images 350 is the same as the resolution of the first resolution chromic images 340 (i.e., the resolution of the panchromatic image 300*a* and the chromic image 300*b*).

The method S300 may further proceeds to step S390, where the demosaiced chromic images 350 are used to reconstruct the image of the object. Since the demosaiced chromic images 350 is generated from the panchromatic image 300*a* and the chromic image 300*b* captured by all pixels of the pixel array, the reconstructed image may have high resolution and quality. In addition, the demosaiced chromic images 350 are generated from the panchromatic image 300*a* and the chromic image 300*b* captured by the same pixel array, so that the operations of the method S300 may be simplified to reduce the signal loss during the process.

The method S400 is described below in conjunction with FIG. 4A and FIG. 4B. The method S400 begins at step S410 and step S420, where a panchromatic image 400*a* and a chromic image 400*b* of an object are captured by a pixel array 100 of the demosaicing device, such as the pixel array 100 in FIG. 2A and FIG. 2B. The operations of step S410 and step S420 are similar to those of step S310 and S320, and therefore are omitted.

The method S400 then proceeds to step S430 to step S460, where a weighted average calculation, a signal subtraction, an interpolation, and an upsampling are performed on the panchromatic image 400*a* and the chromic image 400*b* by a calculating circuit 140 and a processing circuit 142 of the demosaicing device to generate a plurality of first resolution chromic images 440. After step S430 to step S460, the resolution of the first resolution chromic images 440 is the same as the resolution of the panchromatic image 400*a* and the chromic image 400*b*.

In step S430, the signal subtraction is performed on the panchromatic image 400*a* and the chromic image 400*b* by the calculating circuit 140 to generate a subtracted image 410. Specifically, a signal of the panchromatic image 400*a* is subtracted from a signal of the chromic image 400*b* to generate the signal of the subtracted image 410. The signal subtraction is performed based on the pixels of the pixel array. For the clear pixels, a signal of one clear pixel of the panchromatic image 400*a* is subtracted from a signal of the corresponding one clear pixel of the chromic image 400*b* to generate a subtracted signal of one clear pixel of the subtracted image 410. Since the clear pixel is under the clear state when capturing the panchromatic image 400*a* and the chromic image 400*b*, the subtracted signal of the clear pixel may be zero.

For the switchable pixels, a signal of one switchable pixel under the clear state in the panchromatic image 400*a* is subtracted from a signal of the corresponding one switchable pixel under the clear state in the chromic image 400*b* to generate a subtracted signal of one switchable pixel of the subtracted image 410. Therefore, the resolution of the subtracted image 410 is the same as the resolution of the panchromatic image 400*a* and the chromic image 400*b*.

In step S440, the weighted average calculation is then performed on the subtracted image 410 by the calculating circuit 140 to generate a subtracted chromic image 420. Specifically, the weighted average calculation is performed based on the pixel set of the pixel array such that the averaged signal of the pixels in one pixel set represents one signal of the pixel set. In the embodiments which the pixel set includes four pixels, the subtracted signals of the two switchable pixels are averaged to generate the averaged-subtracted signal of the pixel set. The signals of the two clear pixels may not be used in the weighted average calculation. As a result, the subtracted chromic image 420 represented by the pixel set array of two rows by two columns is generated from the subtracted image 410 represented by the pixel array of four rows by four columns. Therefore, the resolution of the subtracted chromic image 420 is lower than the resolution of the subtracted image 410.

In step S450, an interpolation is then performed on the subtracted chromic image 420 by the processing circuit 142 to generate a plurality of second resolution chromic images 430. The operation of step S450 is similar to that of step S360, and therefore is omitted. After step S450, the resolution of the second resolution chromic images 430 is the same as the resolution of the subtracted chromic image 420.

In step S460, an upsampling is then performed on the second resolution chromic images 430 by the processing circuit 142 to generate the first resolution chromic images 440. The operation of step S460 is similar to that of step S370, and therefore is omitted. After step S460, the resolution of the first resolution chromic images 440 is higher than the resolution of the second resolution chromic images 430 but the same as the resolution of the panchromatic image 400*a* and the chromic image 400*b*.

The method S400 then proceeds to step S470, where the first resolution chromic images 440 are fused with the panchromatic image 400*a* by a correction circuit 144 of the demosaicing device to generate a plurality of demosaiced chromic images 450. The method S400 may further proceeds to step S480, where the demosaiced chromic images 450 are used to reconstruct the image of the object. The operations of step S470 and step S480 are similar to those of step S380 and step S390, and therefore are omitted. The resolution of the demosaiced chromic images is the same as the resolution of the panchromatic image and the chromic image, leading to the reconstructed image having high resolution and quality. Furthermore, the simplified operations of the method S400 may reduce the signal loss during the process.

According to the above-mentioned embodiments, the demosaicing device for an image sensor of the present disclosure includes the switchable pixels and the clear pixels arranged as the pixel array. The switchable pixel can switch between the clear state and the color state by applying the voltage bias to the electrochromic layer in the switchable pixel, while the clear pixel without the electrochromic layer remains the clear state. Therefore, the panchromatic image and the chromic image of the object may be captured by the same pixel array to reconstruct the high resolution image in the demosaicing method. Furthermore, the simplified operations of the demosaicing method for the image sensor of the present disclosure may reduce the signal loss during the demosaicing process.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A demosaicing method for an image sensor, comprising:

capturing a panchromatic image by using a pixel array comprising a plurality of switchable pixels and a plurality of clear pixels when the switchable pixels and the clear pixels are under a clear state;

capturing a chromic image by using the pixel array when the switchable pixels are under a color state and the clear pixels are under the clear state;

performing a weighted average calculation and a signal subtraction on the chromic image and the panchromatic image to generate a plurality of first resolution chromic images, wherein a resolution of the first resolution chromic images is same as a resolution of the panchromatic image and the chromic image, wherein the step of performing the weighted average calculation and the signal subtraction to generate the plurality of the first resolution chromic images comprises:

generating a subtracted chromic image from the chromic image and the panchromatic image, wherein a resolution of the subtracted chromic image is lower than the resolution of the first resolution chromic images, and the step of generating the subtracted chromic image comprises:

performing the signal subtraction by subtracting a signal of the panchromatic image from a signal of the chromic image to generate a subtracted image; and performing the weighted average calculation on the subtracted image to generate the subtracted chromic image; and fusing the plurality of the first resolution chromic images with the panchromatic image to generate a plurality of demosaiced chromic images.

2. The demosaicing method of claim 1, wherein each of the switchable pixels comprises an electrochromic layer, wherein the electrochromic layer is transparent when each of the switchable pixels is under the clear state, wherein the electrochromic layer is colored when each of the switchable pixels is under the color state.

3. The demosaicing method of claim 2, wherein the electrochromic layer is unbiased when each of the switchable pixels is under the clear state, wherein the electrochromic layer is biased when each of the switchable pixels is under the color state.

4. The demosaicing method of claim 1, further comprising:

performing an interpolation on the subtracted chromic image to generate a plurality of second resolution chromic images, wherein a resolution of the second resolution chromic images is same as the resolution of the subtracted chromic image.

5. The demosaicing method of claim 4, further comprising:

performing an upsampling on the plurality of the second resolution chromic images to generate the plurality of the first resolution chromic images.

6. The demosaicing method of claim 1, wherein a pixel set of the pixel array comprises two of the switchable pixels and two of the clear pixels arranged in an array of two rows by two columns.

7. The demosaicing method of claim 6, wherein the step of performing the weighted average calculation on the panchromatic image comprises:

averaging signals of the switchable pixels under the clear state and the clear pixels under the clear state to generate an averaged signal of the pixel set.

8. The demosaicing method of claim 6, wherein the step of performing the weighted average calculation on the chromic image comprises:

averaging signals of the switchable pixels under the color state to generate an averaged signal of the pixel set.

9. The demosaicing method of claim 6, wherein the step of performing the signal subtraction on the chromic image and the panchromatic image comprises:

subtracting a signal of one of the switchable pixels under the color state from a signal of the one of the switchable pixels under the clear state to generate a subtracted signal of the one of the switchable pixels.

10. The demosaicing method of claim 6, wherein the step of performing the signal subtraction on the chromic image and the panchromatic image comprises:

subtracting a signal of one of the clear pixels of the panchromatic image from a signal of the one of the clear pixels of the chromic image to generate a subtracted signal being zero.

11. The demosaicing method of claim 1, wherein the pixel array comprises two first pixel sets, one second pixel set, and one third pixel set, wherein each of the first pixel sets, the second pixel set, and the third pixel set comprises two of the switchable pixels and two of the clear pixels, wherein the first pixel sets, the second pixel set, and the third pixel set are arranged in an array of two rows by two columns.

12. The demosaicing method of claim 11, wherein the switchable pixels of the first pixel sets under the color state are green pixels, the switchable pixels of the second pixel set under the color state are red pixels, and the switchable pixels of the third pixel set under the color state are blue pixels.

13. The demosaicing method of claim 1, wherein the clear pixels and the switchable pixels are alternately arranged.

14. A demosaicing device for an image sensor, comprising:

a pixel array capturing a panchromatic image and a chromic image, comprising:

a switchable pixel, comprising a first photodiode and an electrochromic layer above the first photodiode, wherein the switchable pixel further comprises a bottom electrode between the first photodiode and the electrochromic layer, an electrolyte layer on the electrochromic layer, an ion storage layer on the electrolyte layer, a top electrode on the ion storage layer, and a micro lens array on the top electrode; and a clear pixel adjacent to the switchable pixel and comprising a second photodiode, wherein the electrolyte layer, the ion storage layer, the top electrode, and the micro lens array extend above the second photodiode, wherein the switchable pixel and the clear pixel are under a clear state when the electrochromic layer is unbiased, wherein the switchable pixel is under a color state and the clear pixel is under the clear state when the electrochromic layer is biased;

a calculating circuit performing a weighted average calculation and a signal subtraction on the chromic image and the panchromatic image to generate a plurality of first resolution chromic images; and a correction circuit fusing the plurality of the first resolution chromic images with the panchromatic image to generate a plurality of demosaiced chromic images.

15. The demosaicing device of claim 14, wherein the first photodiode and the electrochromic layer are individually controlled by different transistors.

16. A demosaicing method for an image sensor, comprising:

capturing a panchromatic image by using a pixel array comprising a plurality of switchable pixels and a plurality of clear pixels when the switchable pixels and the clear pixels are under a clear state, wherein a pixel set of the pixel array comprises two of the switchable pixels and two of the clear pixels arranged in an array of two rows by two columns;

capturing a chromic image by using the pixel array when the switchable pixels are under a color state and the clear pixels are under the clear state;

performing a weighted average calculation and a signal subtraction on the chromic image and the panchromatic image to generate a plurality of first resolution chromic images, wherein a resolution of the first resolution chromic images is same as a resolution of the panchromatic image and the chromic image, wherein the step of performing the signal subtraction on the chromic image and the panchromatic image comprises subtracting a signal of one of the clear pixels of the panchromatic image from a signal of the one of the clear pixels of the chromic image to generate a subtracted signal being zero; and fusing the plurality of the first resolution chromic images with the panchromatic image to generate a plurality of demosaiced chromic images.

* * * * *